United States Patent
Tomioka et al.

[11] Patent Number: 5,933,282
[45] Date of Patent: Aug. 3, 1999

[54] VARI-FOCAL IMAGE PICKUP OPTICAL SYSTEM FOR ENDOSCOPES

[75] Inventors: Makoto Tomioka, Hachioji; Susumu Aruga, Nerima, both of Japan

[73] Assignee: Olympus Optical Co., Ltd., Tokyo, Japan

[21] Appl. No.: 08/869,889

[22] Filed: Jun. 5, 1997

[30] Foreign Application Priority Data

Jun. 6, 1996 [JP] Japan .................................. 8-165090

[51] Int. Cl.⁶ .................................................. G02B 15/14
[52] U.S. Cl. .......................................... 359/685; 359/690
[58] Field of Search .................................... 359/685, 690

[56] References Cited

U.S. PATENT DOCUMENTS

| | | | |
|---|---|---|---|
| 3,415,592 | 12/1968 | Price | 359/690 |
| 4,437,732 | 3/1984 | Ishiyama | 359/685 |
| 4,449,791 | 5/1984 | Terasawa et al. | 359/685 |
| 4,687,303 | 8/1987 | Takahashi et al. | 359/685 |
| 4,776,679 | 10/1988 | Kitagishi et al. | 359/690 |
| 4,781,445 | 11/1988 | Baba et al. | |
| 4,991,942 | 2/1991 | Fujibayashi et al. | 359/690 |
| 5,157,552 | 10/1992 | Hagimori | 359/690 |
| 5,245,475 | 9/1993 | Takasugi | 359/690 |
| 5,257,134 | 10/1993 | Sugawara | 359/690 |
| 5,260,834 | 11/1993 | Shibata et al. | 359/690 |
| 5,311,361 | 5/1994 | Nozawa | 359/690 |
| 5,414,561 | 5/1995 | Wakimoto et al. | 359/690 |
| 5,442,486 | 8/1995 | Sato | 359/690 |
| 5,717,527 | 2/1998 | Shibayama | 359/685 |

FOREIGN PATENT DOCUMENTS 1-128031 5/1989 Japan .

*Primary Examiner*—Georgia Epps
*Assistant Examiner*—Evelyn A. Lester
*Attorney, Agent, or Firm*—Pillsbury Madison & Sutro LLP

[57] ABSTRACT

A vari-focal image pickup optical system for endoscopes comprising, in order from the object side, a first focusing lens unit which is capable of adjusting a diopter within a range covering positive and negative values, and has a positive refractive power, a second variator lens unit which has a vari-focal function and a negative refractive power, and a third compensator lens unit which maintains an image at a constant location by correcting a deviation of an image location caused by changing a magnification, wherein magnifications of the second lens unit and the third lens unit are changed around a magnification level of −1×, wherein a magnification of the optical system is changed from that at a wide position to that at a tele position by moving the second lens unit from the object side toward the image side and moving the third lens unit from the image side toward the object side, and wherein the third lens unit is set at the magnification level of −1× when the second lens unit is set at the magnification level of −1×. The image pickup optical system is compact and light in weight, requires simple procedures for operation and can sufficiently cope with image pickup devices having picture elements arranged at high densities.

10 Claims, 4 Drawing Sheets

VARI-FOCAL IMAGE PICKUP OPTICAL SYSTEM FOR ENDOSCOPES

BACKGROUND OF THE INVENTION a) Field of the Invention

The present invention relates to a zoom image pickup optical system which can be attached to eyepieces of endoscopes.

b) Description of the Prior Art

TV cameras and film cameras are often attached to eyepieces of endoscopes for diagnoses and recording. In recent days, in particular, compact TV cameras using solid-state image pickup devices such as CCDs are being increasingly adopted to project images formed with endoscopes onto TV monitors for diagnoses and medical treatments.

Since the image pickup devices used in the TV cameras are now made to be more compact and to have picture elements arranged at high densities due to recent progress made in the semiconductor technology, optical systems which are to be used in combination with the image pickup devices must have sufficiently high optical performance.

FIG. 1 shows a system for projecting an image of an object formed with an endoscope onto a TV monitor in which an adaptor 3 and a TV camera 5 are attached to an eyepiece 2 of an endoscope 1.

In the image projecting system having the configuration described above, an image of the object formed with the eyepiece 2 disposed in the endoscope 1 is imaged through an image pickup optical system 4 disposed in the adaptor 3 onto an image pickup device 6 disposed in the TV camera.

For practical use of the image projecting system, several kinds of adaptors having different magnifications are prepared and selectively used dependently on kinds, purposes, etc. of endoscopes to be combined. Accordingly, this system requires a large number of adaptors, are highly priced and obliges a user to exchange the adaptors when he desires to change a size of an observed location by switching magnifications in the course of use, thereby hardly permitting exchange of adaptors, for example, during a surgical operation. Further, it is actually impossible, by exchange of the adaptors, to control an image to a size desired by the user, for example a surgical operator, and he is obliged to find a certain point of compromise.

For correcting such a defect, it is often carried out to use a zoom optical system in the adaptor or a similar section for freely changing a size of an image of a location which is being observed.

Eyepieces of a specific kind of endoscope are mostly configured so as to have imaging points at a certain definite distance or a definite diopter and be set at a definite structural location when attached to adaptors.

When an optical system is combined with endoscopes which have a definite diopter, object points remain unchanged since the endoscopes have the definite diopter. Accordingly, the optical system, even if it is a zoom optical system, may not use a focusing mechanism as an optical system disclosed by Japanese Patent Kokai Publication No. Hei 1-128031. In the case of non-flexible endoscopes or the similar instruments, however, diopters of eyepieces may be different dependently on kinds of scopes or certain ordinary endoscopes use eyepieces having different diopters and diopters are actually changed dependently on object points.

When diopters are to be different dependently on endoscopes to be combined with a zoom optical system or objects to be observed, it is necessary to dispose a focusing mechanism in the zoom optical system. As a method to focus the zoom optical system, it is conceivable to move the zoom optical system as a whole in a direction along an optical axis. When a zoom optical system is moved as a whole for focusing as in an image pickup optical system disclosed by U.S. Pat. No. 4,781,445, for example, a focal length of the optical system as a whole is varied by zooming and a diopter of an endoscope is varied, whereby a focusing amount required for diopter adjustment, or moving distance of the optical system, is varied dependently on magnifications. When a focal length at a tele position is twice as long as that at a wide position, for example, a lens system must be moved for a distance four times as long for the same diopter adjustment. Accordingly, it is required to reserve wide spaces before and after the optical system, thereby enlarging an adapter as a whole. Further, a change of a magnification of the zoom optical system results in a variation of an amount of diopter adjustment, thereby making it impossible to provide a scale for indicating ranges of diopter adjustments. As a result, the image pickup system cannot indicate locations at which the zoom optical system is brought into focus even when the optical system is combined with an endoscope having a known diopter, thereby obliging users to focus the optical system while actually observing an image.

Since an adaptor is attached to an endoscope and operated integrally therewith, it is important to configure the adaptor to be as compact and light as possible for facilitating its manipulation or lessening burdens imposed on users or surgical operators.

SUMMARY OF THE INVENTION

A primary object of the present invention is to provide a zoom vari-focal optical system which is usable in a condition attached to an eyepiece of an endoscope of any kind, capable of controlling an image formed by the endoscope to desired sizes, equipped with a mechanism for adjusting a focused condition in accordance with a diopter of the endoscope, simple in composition, compact and light in weight, and can easily be manipulated and sufficiently cope with image pickup devices having picture elements arranged at high densities.

The vari-focal image pickup optical system for endoscopes according to the present invention is used in a condition where it is attached to an eyepiece of an endoscope and configured to reform an image formed with the endoscope at an optically changed magnification level. This optical system is composed, in order from the object side, of a first focusing lens unit which is capable of adjusting a diopter to a value within a range covering positive and negative values, and has a positive refractive power, a second variator lens unit which has a vari-focal function and a negative refractive power, and a third lens unit which functions to maintain an image at a constant location by correcting a deviation of an image location caused by changing a magnification. The second lens unit and the third lens unit are configured to have magnifications which are variable within ranges around −1×, a magnification of the optical system is changed from that at a wide position to that at a tele position by moving the second lens unit from the object side toward the image side and moving the third lens unit from the image side toward the object side, and the third lens unit is set at a magnification of −1× when the second lens unit is set at the magnification of −1× during the change of the magnification of the optical system.

Further, the vari-focal image pickup optical system for endoscopes according to the present invention is configured to satisfy the following conditions (1) and (2):

$$1.8 < f_1 < 25 \tag{1}$$

$$0.5 < f_W/f_1 < 1 \tag{2}$$

Furthermore, the vari-focal image pickup optical system for endoscopes according to the present invention is configured to satisfy the following conditions (3) and (4):

$$0.5 < f_3/f_W < 1 \tag{3}$$

$$0.6 < |f_2/f_3| < 1 \tag{4}$$

DETAILED DESCRIPTION OF THE PREFERRED EMBODIMENTS

Figure 3A:
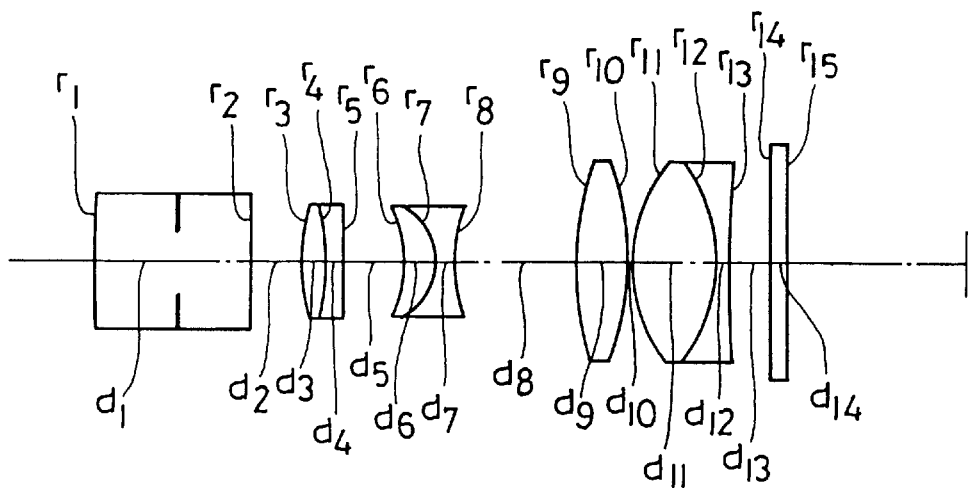
FIGS. 3A, 3B and 3C show sectional views illustrating a composition of a first embodiment of the vari-focal image pickup optical system according to the present invention.
Figure 3B:
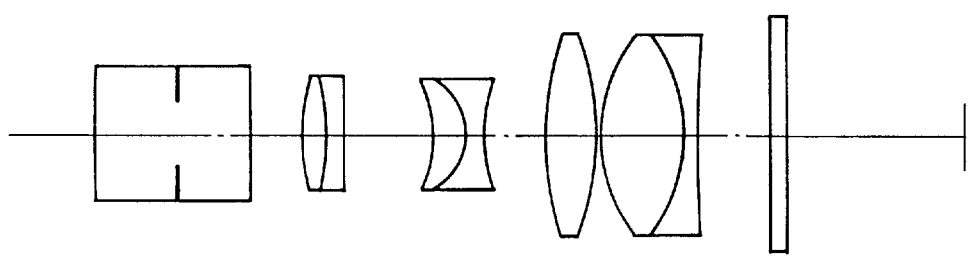
Figure 3C:
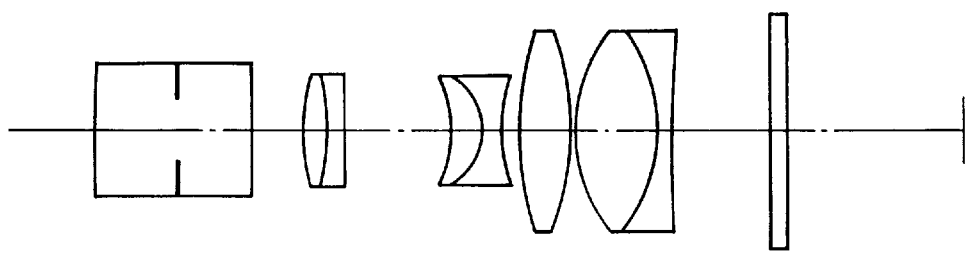

The zoom image pickup optical system for endoscopes according to the present invention can be attached to an eyepiece of an endoscope and is configured to image an image formed with the endoscope while changing a magnification to an optional level. As shown in FIGS. 3A through 3C, for example, this optical system is composed, in order from the object side, of a first focusing lens unit which is capable of adjusting a diopter within a range covering positive and negative values, and has a positive refractive power, a second variator lens unit which has a vari-focal function and a negative refractive power, and a third compensator lens unit which has a function to maintain an image at a constant location during the change of the magnification, and characterized in that magnifications of the second lens unit and the third lens unit are changed around −1×, that a magnification of the optical system is changed from that at a wide position to that at a tele position by moving the second lens unit from the object side toward the image side and moving the third lens unit from the image side toward the object side, and that the third lens unit is set at a magnification of −1× when the second lens unit is set at the magnification of −1×.

The zoom image pickup optical system for endoscopes according to the present invention is also characterized in that it is configured to satisfy the following conditions (1) and (2):

$$18 < f_1 < 25 \tag{1}$$

$$0.5 < f_W/f_1 < 1 \tag{2}$$

wherein the reference symbol $f_1$ represents a focal length of the first lens unit and the reference symbol $f_W$ designates a focal length of the optical system as a whole at the wide position.

Further, the zoom image pickup optical system for endoscopes according to the present invention is an optical system which has the composition described above or an optical system which has the composition described above and satisfies the above-mentioned conditions (1) and (2), and is configured to satisfy the following conditions (3) and (4):

$$0.5 < f_3/f_W < 1 \tag{3}$$

$$0.6 < |f_2/f_3| < 1 \tag{4}$$

wherein the reference symbols $f_2$ and $f_3$ represent focal lengths of the second lens unit and the third lens unit respectively.

When a focusing lens unit (first lens unit) of an optical system to be attached to an eyepiece of an endoscope, like the optical system according to the present invention, is disposed immediately after a connector section, it is sufficient for focusing the optical system to move the focusing lens unit for a certain definite distance for variations of a diopter of the eyepiece of the endoscope in all zoomed conditions, or at all zoom positions between the wide position and the tele position. Accordingly, it is sufficient to perform only zooming, or it is unnecessary to readjust a diopter after zooming, when it is desired to change a size of an image after focusing the optical system by moving the focusing lens unit at a certain magnification of an adaptor (the zoom image pickup optical system).

One of characteristics of the zoom image pickup optical system according to the present invention lies in that it is capable of adjusting a diopter within a range covering negative and positive values. Since eyepieces of certain endoscopes have diopters set at negative values and those of other endoscopes are set at positive values, the zoom image pickup optical system according to the present invention is configured to be capable of adjusting a diopter within the range covering the negative and positive values so that it can cope with all the endoscopes or cover the entire range of the diopters.

For configuring a moving mechanism of the zoom optical system to be compact and reducing eccentricities of the second lens unit and the third lens unit caused by moving the second lens unit and the third lens unit, it is required to relatively shorten a moving distance for each of the second lens unit and the third lens unit. For meeting this requirement, it is necessary to relatively shorten a variation of a distance as measured from an object point to an image point caused by moving the second lens unit and a variation of the distance as measured from the object point to the image point caused by moving the third lens unit.

The relationship of a distance IO as measured from an object point O to an image point I relative to a magnification β is expressed by the following formula (a):

$$IO = f\{2 - \beta(1/\beta)\} \quad (\beta < 0) \tag{a}$$

Figure 1:
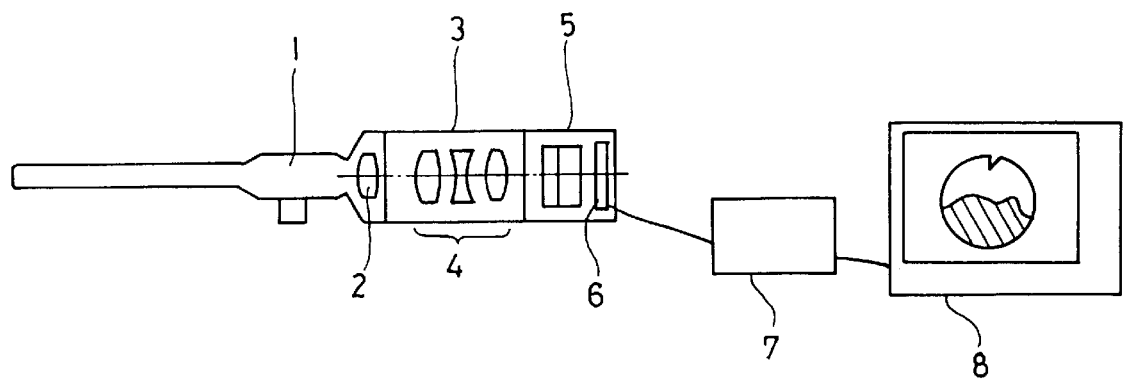
FIG. 1 shows a diagram illustrating a configuration of a system for projecting an image of an object formed with an endoscope to a TV monitor.
Figure 2:
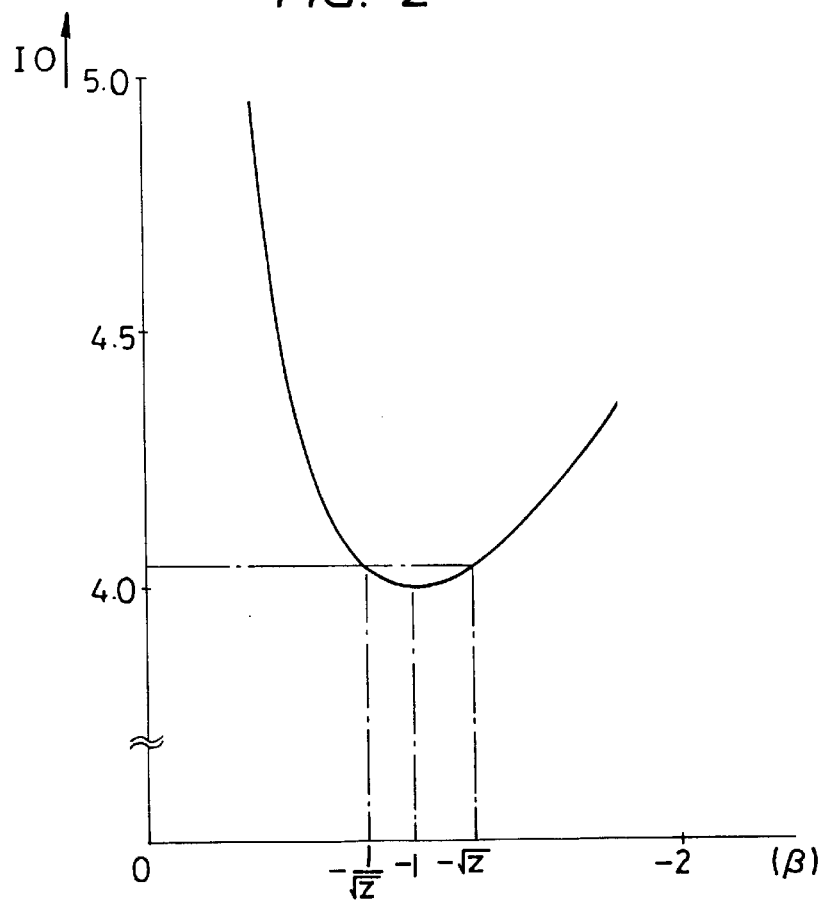
FIG. 2 is a graph illustrating the relationship of magnifications versus distances between object points and image points.

FIG. 2 shows this relationship in a form of a graph. Further, the formula (b) shown below applies to a focal length of a zoom optical system as a whole.

$$f = f_1 \times \beta_2 \times \beta_3 \tag{b}$$

wherein the reference symbols $\beta_2$ and $\beta_3$ represent magnifications of the second lens unit and the third lens unit respectively.

When a zoom ratio of the optical system is represented by z, the relationship of the zoom ratio relative to a total magnification $\beta_2 \times \beta_3$ of the second lens unit and the third lens unit within a range from the wide position to the tele position is expressed by the following formula (c):

$$1/\sqrt{z} \leq \beta_2 \times \beta_3 \leq \sqrt{z} \quad (c)$$

As seen from FIG. 2, the variation of the distance IO caused by moving the second lens unit and the third lens unit is the minimum when the lens system has a magnification of −1×. For reducing a variation of the distance IO to be caused by moving the second lens unit and the third lens unit, it is necessary to move each of these lens units so as to decrease or increase the magnification monotonously around −1×. Further, it is necessary to share the role to change the magnification between the second lens unit and the third lens unit for configuring the lens system compactly as a whole.

When the magnification is changed around −1× as described above, the distance IO has an extreme point as seen from FIG. 2. When the second lens unit and the third lens unit are moved so that magnifications thereof are changed around the magnification of −1×, magnifications of these lens units have extreme points respectively. The movements of the second lens unit and the third lens unit serve not only for changing the magnification of the zoom optical system but also for maintaining an image point thereof always at a constant location. Accordingly, the image point may not be maintained always at a constant location when both the magnifications of the second lens unit and the third lens unit have extreme points respectively. When a position of the zoom optical system at which the second lens unit has the magnification of −1× is coincident with a position of the zoom optical system at which the third lens unit has the magnification of −1×, however, the extreme points of the magnifications are coincident with each other and can be regarded as one. When magnifications of the second lens unit and the third lens unit are to be changed around −1×, it is therefore necessary to coincide the location at which the second lens unit has a magnification −1× with that at which the third lens unit has the magnification of −1×.

The conditions (1) and (2) mentioned above are required for obtaining an optimum focusing lens unit. As a CCD used as an image receiving device is compacter, it is required to configure a zoom optical system so as to have a lower magnification and whereby a focal length $f_1$ is shortened. Accordingly, a focusing lens unit must have a shorter focal length $f_1$. When the focusing lens unit has a shorter focal length $f_1$, a focused condition of the optical system is too sensitive to the movement of the first lens unit and requires a sophisticated technique for adjustment. When the focal length $f_3$ of the focusing lens unit is too long, in contrast, it is obliged to reserve a wide airspace between the first lens unit and the second lens unit for adjusting the focused condition. For this reason, it is desirable that the focal length $f_1$ of the first lens unit satisfies the above-mentioned conditions (1) and (2).

The condition (3) is required for configuring the zoom optical system so as to have an adequate back focal length. When the focal length $f_1$ of the focusing lens unit is short, for use with a compact CCD adopted as an image pickup device, it is necessary to reserve a long back focal length for disposing a mechanism of lens mount. For prolonging a distance as measured from a final surface of the third lens unit to an image surface, or a back focal length, it is necessary to prolong the focal length $f_3$ of the third lens unit. For reserving such a long back focal length, it is necessary to satisfy the relationship of $0.5<f_3/F_w$. When $f_3$ is prolonged, however, rays pass through higher portions of the third lens unit, thereby obliging it to configure the third lens unit larger. It is therefore necessary to satisfy the relationship of $f_3/f_w<1$ for configuring the zoom optical system to be compact. That is to say, $0.5<f_3/f_w$ is a condition which is required for configuring the zoom optical system to be compact while reserving a sufficient back focal length.

If the lower limit of the condition (3) is exceeded, it will be impossible to reserve a long back focal length. If the upper limit of the condition (3) is exceeded, in contrast, it will be impossible to reduce hights of rays, thereby making it impossible to configure the zoom optical system to be compact.

The condition (4) is required for facilitating the correction of aberrations in lens design, and obtaining an optical system which has high optical performance and favorably corrected aberrations (coma in particular). If the focal length $f_2$ of the second lens unit is too short or exceeds the lower limit of the condition (4), coma will be produced remarkably on the positive side. If the focal length $f_3$ of the third lens unit is too short or exceeds the upper limit of the condition (4), in contrast, coma will be produced too remarkably on the negative side. It will be difficult to enhance optical performance in either case. The condition (4) is required also to prevent shading by restricting angles of incidence of rays onto the CCD.

Now, description will be made of the preferred embodiments of the vari-focal image pickup optical system for endoscopes according to the present invention.

| Embodiment 1 |
| --- |
| f = 15.83297 ~ 23.46981 ~ 30.72295, |
| F number = 4.371 ~ 6.557 ~ 8.742 |
| image height = 1.922 ~ 2.282 ~ 2.282, |
| object distance = 1000 ~ 1000 ~ 1000 |

| | | |
| --- | --- | --- |
| $r_1 = \infty$ | | |
| $d_1 = 9.0000$ | $n_1 = 1.51633$ | $v_1 = 64.15$ |
| $r_2 = \infty$ | | |
| $d_2 = 3.0000$ | | |
| $r_3 = 13.7100$ | | |
| $d_3 = 1.3700$ | $n_2 = 1.71999$ | $v_2 = 50.25$ |
| $r_4 = -13.7100$ | | |
| $d_4 = 1.0000$ | $n_3 = 1.78472$ | $v_3 = 25.71$ |
| $r_5 = \infty$ | | |
| $d_5 = Z_1$ (variable) | | |
| $r_6 = -7.3520$ | | |
| $d_6 = 1.8000$ | $n_4 = 1.84666$ | $v_4 = 23.78$ |
| $r_7 = -3.7150$ | | |
| $d_7 = 1.0000$ | $n_5 = 1.63930$ | $v_5 = 44.88$ |
| $r_8 = 8.7190$ | | |
| $d_8 = Z_2$ (variable) | | |
| $r_9 = 20.8230$ | | |
| $d_9 = 3.0000$ | $n_6 = 1.72916$ | $v_6 = 54.68$ |
| $r_{10} = -16.5760$ | | |
| $d_{10} = 0.3000$ | | |
| $r_{11} = 10.4340$ | | |
| $d_{11} = 4.8000$ | $n_7 = 1.51633$ | $v_7 = 64.15$ |
| $r_{12} = -10.4340$ | | |
| $d_{12} = 0.8000$ | $n_8 = 1.84666$ | $v_8 = 23.78$ |
| $r_{13} = 82.2840$ | | |
| $d_{13} = z_3$ (variable) | | |
| $r_{14} = \infty$ | | |
| $d_{14} = 1.0000$ | $n_9 = 1.51633$ | $v_9 = 64.15$ |
| $r_{15} = \infty$ | | |

| f | 15.83297 | 23.46981 | 30.72295 |
| --- | --- | --- | --- |
| $Z_1$ | 3.64131 | 5.30217 | 6.28877 |
| $Z_2$ | 7.22513 | 3.70502 | 1.19364 |
| $Z_3$ | 2.30781 | 4.16705 | 5.69183 |

$f_1 = 20.837$, $f_w/f_1 = 0.76$, $f_3/f_w = 0.6325$
$|f_2/f_3| = 0.72888$

Embodiment 2 f = 2.53763, F number = 5.265, image height = 2.282, object distance = 30

| | | |
|---|---|---|
| $R_1 = \infty$ | | |
| $D_1 = 0.4000$ | $N_1 = 1.76820$ | $V_1 = 71.79$ |
| $R_2 = \infty$ | | |
| $D_2 = 0.2000$ | | |
| $R_3 = \infty$ | | |
| $D_3 = 0.5000$ | $N_2 = 1.88300$ | $V_2 = 40.78$ |
| $R_4 = 1.4600$ | | |
| $D_4 = 0.7500$ | | |
| $R_5 = \infty$ | | |
| $D_5 = 10.0400$ | $N_3 = 1.80610$ | $V_3 = 40.95$ |
| $R_6 = -5.2880$ | | |
| $D_6 = 0.3000$ | | |
| $R_7 = 8.4830$ | | |
| $D_7 = 3.6500$ | $N_4 = 1.60311$ | $V_4 = 60.68$ |
| $R_8 = -3.4700$ | | |
| $D_8 = 1.3500$ | $N_5 = 1.84666$ | $V_5 = 23.78$ |
| $R_9 = -7.8000$ | | |
| $D_9 = 3.0200$ | | |
| $R_{10} = -3.7050$ | | |
| $D_{10} = 1.2000$ | $N_6 = 1.76182$ | $V_6 = 26.52$ |
| $R_{11} = 14.0020$ | | |
| $D_{11} = 3.2000$ | $N_7 = 1.77250$ | $V_7 = 49.60$ |
| $R_{12} = -5.3520$ | | |
| $D_{12} = 7.1100$ | | |
| $R_{13} = 18.9290$ | | |
| $D_{13} = 43.7000$ | $N_8 = 1.62004$ | $V_8 = 36.26$ |
| $R_{14} = \infty$ | | |
| $D_{14} = 2.5800$ | | |
| $R_{15} = 14.1270$ | | |
| $D_{15} = 1.0000$ | $N_9 = 1.80610$ | $V_9 = 40.95$ |
| $R_{16} = 6.4540$ | | |
| $D_{16} = 3.0000$ | $N_{10} = 1.65160$ | $V_{10} = 58.52$ |
| $R_{17} = -25.2790$ | | |
| $D_{17} = 1.8000$ | | |
| $R_{18} = \infty$ | | |
| $D_{18} = 43.7000$ | $N_{11} = 1.62004$ | $V_{11} = 36.26$ |
| $R_{19} = -18.9290$ | | |
| $D_{19} = 8.0000$ | | |
| $R_{20} = 18.9290$ | | |
| $D_{20} = 43.7000$ | $N_{12} = 1.62004$ | $V_{12} = 36.26$ |
| $R_{21} = \infty$ | | |
| $D_{21} = 2.5800$ | | |
| $R_{22} = 14.1270$ | | |
| $D_{22} = 1.0000$ | $N_{13} = 1.80610$ | $V_{13} = 40.95$ |
| $R_{23} = 6.4540$ | | |
| $D_{23} = 3.0000$ | $N_{14} = 1.65160$ | $V_{14} = 58.52$ |
| $R_{24} = -25.2790$ | | |
| $D_{24} = 1.8000$ | | |
| $R_{25} = \infty$ | | |
| $D_{25} = 43.7000$ | $N_{15} = 1.62004$ | $V_{15} = 36.26$ |
| $R_{26} = -18.9290$ | | |
| $D_{26} = 8.0000$ | | |
| $R_{27} = 18.9290$ | | |
| $D_{27} = 43.7000$ | $N_{16} = 1.62004$ | $V_{16} = 36.26$ |
| $R_{28} = \infty$ | | |
| $D_{28} = 2.5800$ | | |
| $R_{29} = 14.1270$ | | |
| $D_{29} = 1.0000$ | $N_{17} = 1.80610$ | $V_{17} = 40.95$ |
| $R_{30} = 6.4540$ | | |
| $D_{30} = 3.0000$ | $N_{18} = 1.65160$ | $V_{18} = 58.52$ |
| $R_{31} = -25.2790$ | | |
| $D_{31} = 1.8000$ | | |
| $R_{32} = \infty$ | | |
| $D_{32} = 43.7000$ | $N_{19} = 1.62004$ | $V_{19} = 36.26$ |
| $R_{33} = -16.5090$ | | |
| $D_{33} = 17.4000$ | | |
| $R_{34} = 17.2600$ | | |
| $D_{34} = 0.9000$ | $N_{20} = 1.78472$ | $V_{20} = 25.71$ |
| $R_{35} = 6.6670$ | | |
| $D_{35} = 2.6000$ | $N_{21} = 1.66672$ | $V_{21} = 48.32$ |
| $R_{36} = -16.4600$ | | |
| $D_{36} = 4.1500$ | | |
| $R_{37} = \infty$ | | |
| $D_{37} = 3.0000$ | $N_{22} = 1.76820$ | $V_{22} = 71.70$ |
| $R_{38} = \infty$ | | |
| $D_{38} = 3.2000$ | | |

Embodiment 2 -continued

| | | |
|---|---|---|
| $r_1 = \infty$ | | |
| $d_1 = 9.0000$ | $n_1 = 1.51633$ | $v_1 = 64.15$ |
| $r_2 = \infty$ | | |
| $d_2 = 3.0000$ | | |
| $r_3 = 13.7100$ | | |
| $d_3 = 1.3700$ | $n_2 = 1.71999$ | $v_2 = 50.25$ |
| $r_4 = -13.7100$ | | |
| $d_4 = 1.0000$ | $n_3 = 1.78472$ | $v_3 = 25.71$ |
| $r_5 = \infty$ | | |
| $d_5 = 3.6413$ | | |
| $r_6 = -7.3520$ | | |
| $d_6 = 1.8000$ | $n_4 = 1.84666$ | $v_4 = 23.78$ |
| $r_7 = -3.7150$ | | |
| $d_7 = 1.0000$ | $n_5 = 1.63930$ | $v_5 = 44.88$ |
| $r_8 = 8.7190$ | | |
| $d_8 = 7.2251$ | | |
| $r_9 = 20.8230$ | | |
| $d_9 = 3.0000$ | $n_6 = 1.72916$ | $v_6 = 54.68$ |
| $r_{10} = -16.5760$ | | |
| $d_{10} = 0.3000$ | | |
| $r_{11} = 10.4340$ | | |
| $d_{11} = 4.8000$ | $n_7 = 1.51633$ | $v_7 = 64.15$ |
| $r_{12} = -10.4340$ | | |
| $d_{12} = 0.8000$ | $n_8 = 1.84666$ | $v_8 = 23.78$ |
| $r_{13} = 82.2840$ | | |
| $d_{13} = 2.3078$ | | |
| $r_{14} = \infty$ | | |
| $d_{14} = 1.0000$ | $n_9 = 1.51633$ | $v_9 = 64.15$ |
| $r_{15} = \infty$ | | |

Embodiment 3 f = 15.87920 ~ 23.57192 ~ 30.97279,
F number = 4.371 ~ 6.557 ~ 8.742
image height = 1.922 ~ 2.282 ~ 2.282,
object distance = 1000 ~ 1000 ~ 1000

| | | |
|---|---|---|
| $r_1 = \infty$ | | |
| $d_1 = 9.0000$ | $n_1 = 1.51633$ | $v_1 = 64.15$ |
| $r_2 = \infty$ | | |
| $d_2 = 3.0000$ | | |
| $r_3 = 13.7100$ | | |
| $d_3 = 1.3700$ | $n_2 = 1.71999$ | $v_2 = 50.25$ |
| $r_4 = -13.7100$ | | |
| $d_4 = 1.0000$ | $n_3 = 1.78472$ | $v_3 = 25.71$ |
| $r_5 = \infty$ | | |
| $d_5 = Z_1$ (variable) | | |
| $r_6 = -7.3520$ | | |
| $d_6 = 1.8000$ | $n_4 = 1.84666$ | $v_4 = 23.78$ |
| $r_7 = -3.7150$ | | |
| $d_7 = 1.0000$ | $n_5 = 1.63930$ | $v_5 = 44.88$ |
| $r_8 = 8.7190$ | | |
| $d_8 = Z_2$ (variable) | | |
| $r_9 = 23.1367$ | | |
| $d_9 = 3.3333$ | $n_6 = 1.72916$ | $v_6 = 54.68$ |
| $r_{10} = -18.4178$ | | |
| $d_{10} = 0.3333$ | | |
| $r_{11} = 11.5933$ | | |
| $d_{11} = 5.3333$ | $n_7 = 1.51633$ | $v_7 = 64.15$ |
| $r_{12} = -11.5933$ | | |
| $d_{12} = 0.8889$ | $n_8 = 1.84666$ | $v_8 = 23.78$ |
| $r_{13} = 91.4267$ | | |
| $d_{13} = Z_3$ (variable) | | |
| $r_{14} = \infty$ | | |
| $d_{14} = 1.0000$ | $n_9 = 1.51633$ | $v_9 = 64.15$ |
| $r_{15} = \infty$ | | |

| f | 15.87920 | 23.57192 | 30.97279 |
|---|---|---|---|
| $Z_1$ | 3.65340 | 4.90800 | 6.16260 |
| $Z_2$ | 9.66453 | 5.75587 | 3.26579 |
| $Z_3$ | 3.85881 | 6.51286 | 7.74834 |

$f_1 = 20.837$, $f_w/f_1 = 0.7621$, $f_3/f_w = 0.7$
$|f_2/f_3| = 0.656$ wherein the reference symbols $r_1, r_2, \ldots, R_1, R_2, \ldots$ represent radii of curvature on respective lens elements, the reference symbols $d_1, d_2, \ldots, D_1, D_2, \ldots$ designate thicknesses of the respective lens elements and airspaces reserved therebetween, the reference symbols $n_1, n_2, \ldots$, $N_1, N_2, \ldots$ denote refractive indices of the respective lens elements and the reference symbols $\upsilon_1, \upsilon_2, \ldots V_1, V_2, \ldots$ represent Abbe's members of the respective lens elements.

The first embodiment has a composition illustrated in FIGS. 3A through 3C: FIG. 3A showing a composition at a wide position, FIG. 3B showing a composition at an intermediate focal length and FIG. 3C showing a composition at a tele position at which a magnification of the zoom optical system is enhanced twice as high.

A first lens unit ($r_3$ through $r_5$) is a focusing lens unit which is moved for enabling are to adjust a diopter within a range covering positive and negative values. The first embodiment is configured to perform diopter adjustment at a rate of 1 diopter by moving the first lens unit for a distance of 0.4342 mm. A magnification of the second lens unit is variable within a range from $-0.862\times$ to $-1.25\times$ and a magnification of the third lens unit is variable within a range from $-0.86\times$ to $-1.21\times$: these lens units being set at a magnification of $-1\times$ at the same position of the optical system.

Figure 4:
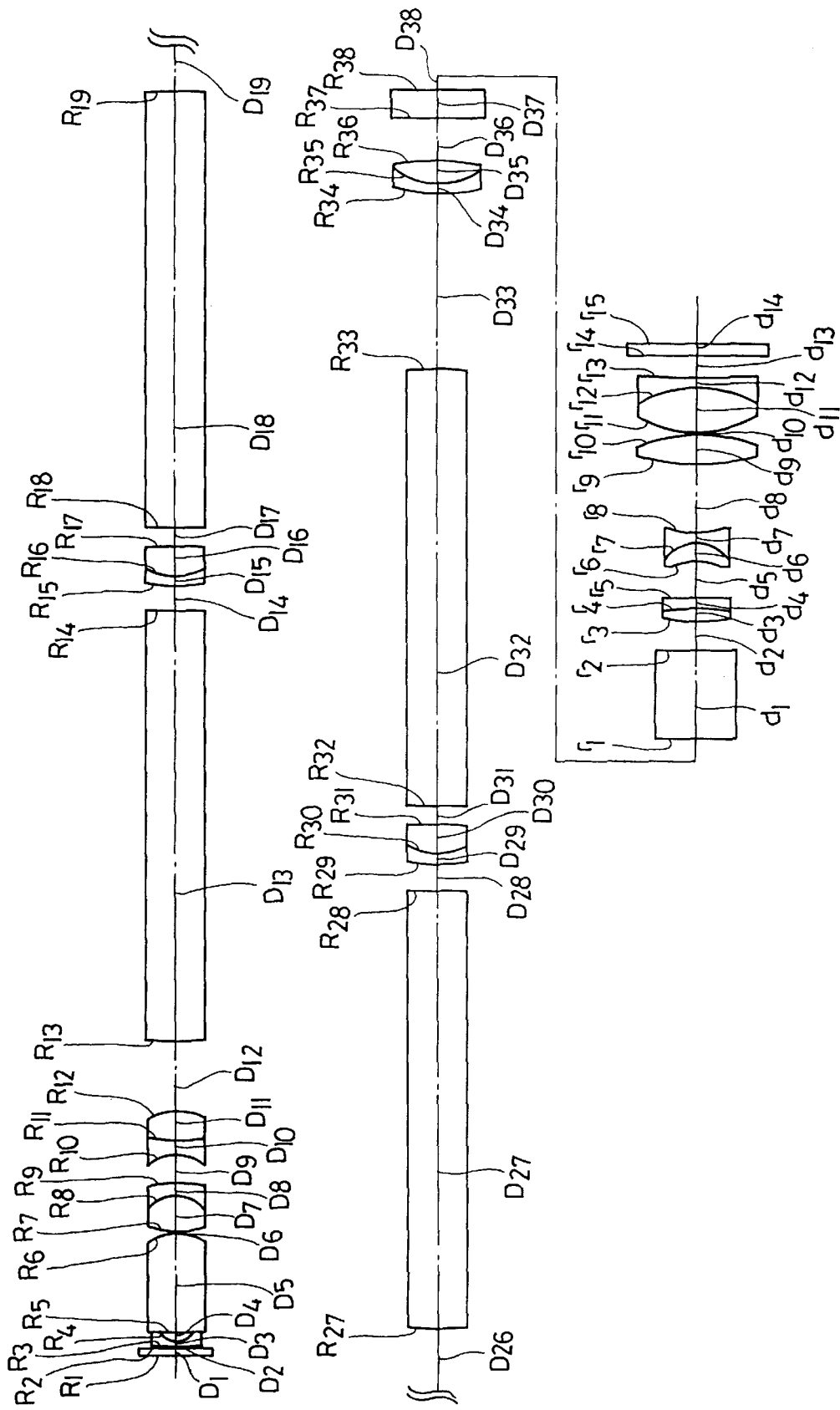
FIG. 4 shows a sectional view illustrating a composition of a second embodiment of the vari-focal image pickup optical system according to the present invention.

The second embodiment has a composition illustrated in FIG. 4, or is configured as a combination of the composition of the first embodiment at its wide position and an optical system for non-flexible endoscopes. In the numerical data, members represented by $N_1, N_2, \ldots, V_1, V_2, \ldots$ compose the optical system for non-flexible endoscopes, whereas members designated by $r_1, r_2, \ldots, d_1, d_2, \ldots, n_1, n_2, \ldots$, $\upsilon_1, \upsilon_2, \ldots$ compose the optical system preferred as the first embodiment.

Figure 5A:
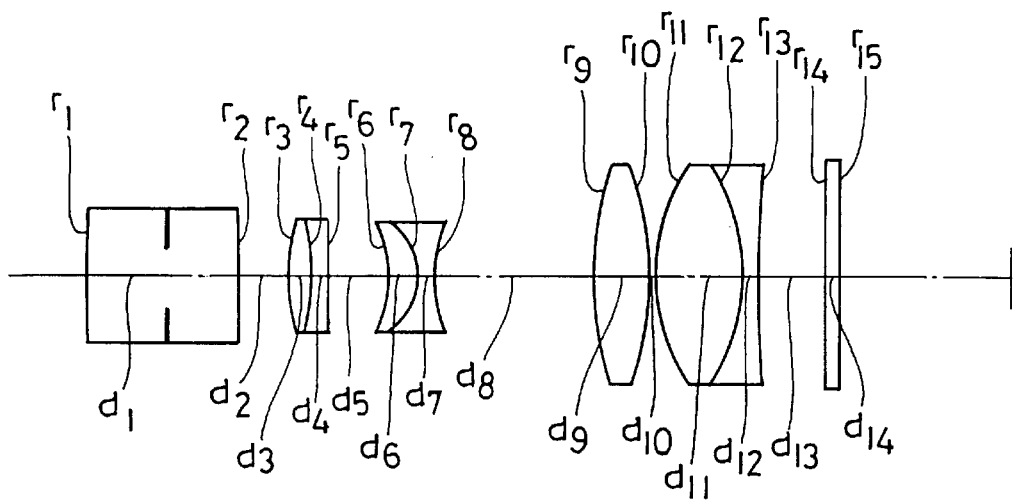
FIGS. 5A, 5B and 5C show sectional views illustrating a composition of a third embodiment of the vari-focal image pickup optical system according to the present invention.
Figure 5B:
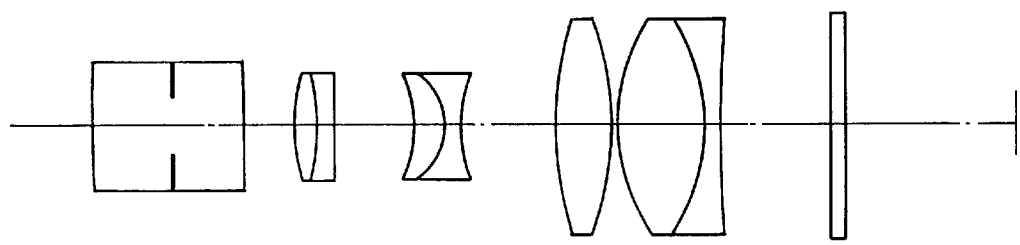
Figure 5C:
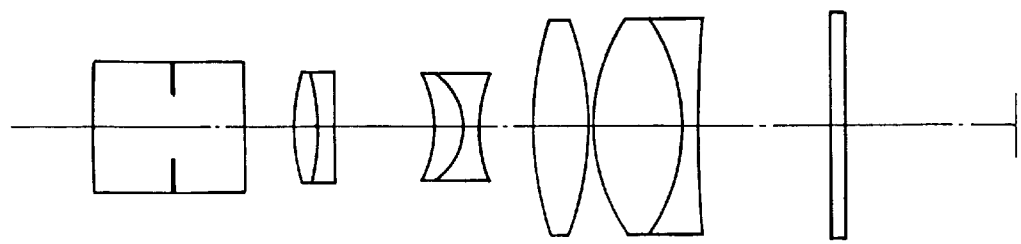

The third embodiment has a composition illustrated in FIGS. 5A through 5C. Like the first embodiment, the third embodiment uses a first lens unit ($r_3$ through $r_5$) as a focusing lens unit which is capable of adjusting a diopter within a range covering positive and negative values. The third embodiment is configured to perform diopter adjustment at a rate of 1 diopter by moving the first lens unit for a distance of 10.4342 mm. A magnification of a second lens unit is variable within a range from $-0.863\times$ to $-1.227\times$ and a magnification of a third lens unit is variable within a range from $-0.86\times$ to $-1.21\times$: the second lens unit and the third lens unit being set at a magnification of $-1\times$ at the same position of the optical system.

In each of the first and third embodiments, a waterproof cover glass plate and a chemical-resistant cover glass plate are disposed before and after the lens system. Further, image pickup optical systems for endoscopes have entrance pupils located in the vicinities of first lens units and principal rays are high on third lens units. For this reason, the optical system according to the present invention uses a thick cover glass plate ($r_1$ to $r_2$) for shortening an optical path length as shown in each of the embodiments.

In the first embodiment and the third embodiment, each of the lens units comprises at least one cemented lens component. Speaking concretely, the first lens unit ($r_3$ through $r_5$) and the second lens unit ($r_6$ through $r_8$) are configured as cemented lens components, whereas the third lens unit ($r_9$ through $r_{13}$) comprises a cemented lens component ($r_{11}$ through $r_{13}$). Speaking more concretely, the first lens unit is composed of a positive cemented lens component which consists of a positive lens element and a negative meniscus lens element in order from the object side, the second lens unit is composed of a negative cemented lens component which consists of a positive meniscus lens element and a negative lens element in order from the object side, and the third lens unit is composed, in order from the object side, of a positive lens component consisting of a positive lens element, and a positive cemented lens component which consists of a positive lens element and a negative lens element in order from the object side. Further, a magnification of the zoom image pickup optical system is changed from that at the wide position to that at the tele position by moving the second lens unit from the object side toward the image side and displacing the third lens unit from the image side toward the object side. These cemented lens components serve for simplifying a composition of a zoom adapter such as the image pickup optical system according to the present invention and reducing a number of mechanical parts, thereby facilitating assembly of the optical system. It is therefore most desirable to compose each of the lens units of a single lens element or a single cemented lens component. Further, it is desirable to dispose a cemented lens component in each of the lens units since the cemented lens components make it possible to correct spherical aberration and chromatic aberration independently in each of the lens units, and serve for reducing variations of aberrations to be caused by zooming.

It is desirable that a cemented lens component to be used in each of the lens units is configured so as to satisfy the following conditions (5), (6) and (7):

$$\upsilon_{1O} > \upsilon_{1I} \tag{5}$$

$$\upsilon_{2O} > \upsilon_{2I} \tag{6}$$

$$\upsilon_{3O} > \upsilon_{3I} \tag{7}$$

wherein the reference symbols $\upsilon_{1O}$ and $\upsilon_{1I}$ represent Abbe's numbers of the lens elements disposed on the object side and the image side respectively in the first lens unit, the reference symbols $\upsilon_{2O}$ and $\upsilon_{2I}$ designate Abbe's numbers of the lens elements disposed on the object side and the image side respectively in the second lens unit, and the reference symbols $\upsilon_{3O}$ and $\upsilon_{3I}$ denote Abbe's numbers of the lens elements disposed on the object side and image side respectively in the third lens unit.

If the condition (5), (6) or (7) is not satisfied, it will be difficult to correct spherical aberration and chromatic aberration independently in each of the lens units.

The second embodiment which is composed by attaching the image pickup optical system preferred as the first embodiment to a non-flexible endoscope makes it possible to pick up an image within a wide range at a field angle of 120° at a wide position of an optical system of the non-flexible endoscope as a whole.

The third embodiment is an example which has a back focal length longer than that of the first embodiment and is advantageous for disposing an image pickup surface at a location farther from the optical system.

The image pickup optical system according to the present invention is capable of forming images at optional sizes when combined with various types of endoscopes, moves lens units for short distances for changing a magnification of the optical system, has a simple composition, is compact and light in weight, and features high optical performance.

We claim:

1. A vari-focal image pickup optical system for endoscopes which is to be used in a condition attached to an eyepiece of an endoscope comprising, in order from the object side:
   a first focusing lens unit which is capable of adjusting a diopter within a range covering positive and negative values, and has a positive refractive power;
   a second variator lens unit which has a vari-focal function and a negative refractive power; and a third compensator lens unit which corrects a deviation of an image location caused by changing a magnification, wherein magnifications of said second lens unit and said third lens unit are changed around $-1\times$, wherein a magnification of said optical system is changed from that at a wide position to that at a tele position by moving said second lens unit from the object side toward the image side and moving said third lens unit from the image side toward the object side, and wherein said third lens unit is set at a magnification of $-1\times$ when said second lens unit is set at the magnification of $-1\times$ during a change of the magnification of said optical system.

2. A vari-focal image pickup optical system for endoscopes which is to be used in a condition attached to an eyepiece of an endoscope comprising, in order from the object side:

a first focusing lens unit which is capable of adjusting a diopter within a range covering positive and negative values, and has a positive refractive power;

a second variator lens unit which has a vari-focal function and a negative refractive power; and a third compensator lens unit which corrects a deviation of an image location caused by changing a magnification, wherein magnifications of said second lens unit and said third lens unit are changed around $-1\times$, wherein a magnification of said optical system is changed from that at a wide position to that at a tele position by moving said second lens unit from the object side toward the image side and moving said third lens unit from the image side toward the object side, and wherein said third lens unit is set at a magnification of $-1\times$ when said second lens unit is set at the magnification of $-1\times$ during a change of the magnification of said optical system, said varifocal image pickup optical system satisfying the following conditions:

$18<f_1<25$ $0.5<f_w/f_1<1$ wherein the reference symbol $f_1$ represents a focal length of said first lens unit and the reference symbol $f_w$ designates a focal length of said vari-focal optical system at the wide position.

3. A vari-focal image pickup optical system for endoscopes which is to be used in a condition attached to an eyepiece of an endoscope comprising, in order from the object side:

a first focusing lens unit which is capable of adjusting a diopter within a range covering positive and negative values, and has a positive refractive power;

a second variator lens unit which has a vari-focal function and a negative refractive power; and a third compensator lens unit which corrects a deviation of an image location caused by changing a magnification, wherein magnifications of said second lens unit and said third lens unit are changed around $-1\times$, wherein a magnification of said optical system is changed from that at a wide position to that at a tele position by moving said second lens unit from the object side toward the image side and moving said third lens unit from the image side toward the object side, and wherein said third lens unit is set at a magnification of $-1\times$ when said second lens unit is set at the magnification of $-1\times$ during a change of the magnification of said optical system, said varifocal image pickup optical system satisfying the following conditions:

$0.5<f_3/f_w<1$ $0.6<|f_2/f_3|<1$ wherein the reference symbols $f_2$ and $f_3$ represent focal lengths of said second lens unit and said third lens unit respectively, and the reference symbol $f_w$ designates a focal length of said vari-focal image pickup optical system at the wide position.

4. A vari-focal image pickup optical system for endoscopes which is to be used in a condition attached to an eyepiece of an endoscope comprising, in order from the object side:

a first focusing lens unit which is capable of adjusting a diopter within a range covering positive and negative values, and has a positive refractive power;

a second variator lens unit which has a vari-focal function and a negative refractive power; and a third compensator lens unit which corrects a deviation of an image location caused by changing a magnification, wherein magnifications of said second lens unit and said third lens unit are changed around $-1\times$, wherein a magnification of said optical system is changed from that at a wide position to that at a tele position by moving said second lens unit from the object side toward the image side and moving said third lens unit from the image side toward the object side, and wherein said third lens unit is set at a magnification of $-1\times$ when said second lens unit is set at the magnification of $-1\times$ during a change of the magnification of said optical system, wherein each of said first lens unit, said second lens unit and said third lens unit comprises a cemented lens component consisting of a positive lens element and a negative lens element.

5. A vari-focal image pickup optical system for endoscopes according to claim 3 wherein each of said first lens unit, said second lens unit and said third lens unit comprises a cemented lens component consisting of a positive lens element and a negative lens element.

6. A vari-focal image pickup optical system for endoscopes according to claim 5 wherein said first lens unit is composed of a positive cemented lens component which consists, in order from the object side, of a positive lens element and a negative lens element, said second lens unit is composed of a negative cemented lens component which consists, in order from the object side, of a positive lens element and a negative lens element, and said third lens unit is composed, in order from the object side, of a positive lens component, and a positive cemented lens component which consists of a positive lens element and a negative lens element.

7. A vari-focal image pickup optical system for endoscopes according to claim 6 satisfying the following conditions:

$$v_{1O} > v_{1I}$$

$$v_{2O} > v_{2I}$$

$$v_{3O} > v_{3I}$$

wherein the reference symbols $vv_{1O}$ and $v_{1I}$ represent Abbe's numbers of the lens elements disposed on the object side and the image side respectively in said first lens unit, the reference symbols $v_{2O}$ and $v_{2I}$ designate Abbe's numbers of the lens elements disposed on the object side and the image side respectively in said second lens unit, and the reference symbols $v_{3O}$ and $v_{3I}$ denote Abbe's numbers of the lens element disposed on the object side and the image side respectively in said third lens unit.

8. A vari-focal image pickup optical system for endoscopes according to claim 1, wherein a cover glass is provided on a light incident side of said first lens unit and on a light emitting side of said third lens unit, and a thickness of the cover glass provided on the light incident side of said first lens unit is greater than that of the cover glass provided on the light emitting side of said third lens unit.

9. A vari-focal image pickup optical system for endoscopes according to claim 1, wherein an entrance pupil is arranged in front of said first lens unit.

10. A vari-focal image pickup optical system for endoscopes according to claim 3, 4, 5, 6 or 7, satisfying the following conditions:

$$18 < f_1 < 25$$

$$0.5 < f_w/f_1 < 1$$

wherein the reference symbol $f_1$ represents a focal length of said first lens unit and the reference symbol $f_w$ designates a focal length of said vari-focal optical system at the wide position.

* * * * *